United States Patent
Boury et al.

(10) Patent No.: US 12,510,569 B2
(45) Date of Patent: Dec. 30, 2025

(54) DEVICE FOR SUPERVISING A SENSED CURRENT

(71) Applicant: Melexis Technologies SA, Bevaix (CH)

(72) Inventors: Bruno Boury, Tessenderlo (BE); Simon Houis, Bevaix (CH); Stephane Rauw, Tessenderlo (BE); Lionel Tombez, Bevaix (CH); Guido Dupont, Bevaix (CH); Adrian Hill, Novi, MI (US)

(73) Assignee: MELEXIS TECHNOLOGIES SA, Bevaix (CH)

( * ) Notice: Subject to any disclaimer, the term of this patent is extended or adjusted under 35 U.S.C. 154(b) by 205 days.

(21) Appl. No.: 18/148,020

(22) Filed: Dec. 29, 2022

(65) Prior Publication Data
US 2023/0204636 A1 Jun. 29, 2023

(30) Foreign Application Priority Data
Dec. 29, 2021 (EP) .................................... 21218043

(51) Int. Cl.
*G01R 19/165* (2006.01)
(52) U.S. Cl.
CPC ............... *G01R 19/16571* (2013.01)
(58) Field of Classification Search
CPC ............ G01R 19/16571; G01R 31/007; G01R 19/16528; G01R 19/2509; H02H 1/0092; H02H 3/087; G01D 21/02
See application file for complete search history.

(56) References Cited

U.S. PATENT DOCUMENTS

| 5,576,632 A | 11/1996 | Petsche et al. |
| 2009/0222142 A1* | 9/2009 | Kao ................. G05B 15/02 700/291 |
| 2014/0168843 A1* | 6/2014 | Privitera ............ G01R 31/50 702/58 |
| 2015/0109077 A1* | 4/2015 | Tomimbang ........ H02H 3/10 335/7 |
| 2019/0199081 A1* | 6/2019 | Ayeb ................ H02H 3/08 |
| 2019/0377012 A1* | 12/2019 | Soo .................. G01R 19/25 |
| 2020/0067299 A1 | 2/2020 | Togami et al. |

FOREIGN PATENT DOCUMENTS

EP 3306765 A1 4/2018

OTHER PUBLICATIONS

Search Report from European Application No. 21218043.4, Jul. 6, 2022.

* cited by examiner

*Primary Examiner* — Alvaro E Fortich
(74) *Attorney, Agent, or Firm* — Workman Nydegger

(57) ABSTRACT

The present invention relates to a current sensor device comprising: current sensing means for sensing a current, a circuit arranged to convert a signal received from the current sensing means into a signal indicative of the sensed current, storage means for storing a plurality of values of the signal indicative of the sensed current, a processing circuit arranged for receiving a subset of the plurality of values stored in the storage means, for detecting or predicting an event based on a function of the subset, said function being stored in the storage means, and for generating a corresponding event signal, said current supervisory device further comprising an interface circuit arranged to output the corresponding event signal.

14 Claims, 5 Drawing Sheets

$$corr = \sum_{n=-m}^{0} i(n) * r(n)$$

DEVICE FOR SUPERVISING A SENSED CURRENT

FIELD OF THE INVENTION

The present invention is generally related to the field of supervisory devices comprising current sensors as used for example in vehicles.

BACKGROUND OF THE INVENTION

Conventionally, many semiconductor integrated circuit devices are provided with an overcurrent protection circuit as one of their abnormality protection circuits. In general, overcurrent protection can be defined as protection against excessive currents or currents beyond the acceptable current rating of equipment. It generally operates instantly. Short circuit is a type of overcurrent. For example, an in-vehicle intelligent power device is provided with an overcurrent protection circuit, which restricts the amount of output current flowing through a power transistor not to exceed an overcurrent set value, for the purpose of preventing the device from breaking in a case of a short-circuit in a load connected to the power transistor. Circuit breakers, e.g. magnetic circuit breakers, fuses and overcurrent relays are commonly used to provide overcurrent protection mechanisms.

Apart from overcurrent a current sensor device may be arranged to detect also other abnormalities in the current behaviour. For example, a short circuit can be detected or a malfunctioning car battery or electrical subsystem in a car.

In state of the art solution overcurrent protection is often implemented by comparing a single sensed current value to a certain threshold. If the value exceeds the threshold level, then a warning signal is launched as a consequence of the detected overcurrent event. If the value is below the threshold level, then nothing special happens and operation can continue.

There is a need for a current supervisory device with enriched functionality.

SUMMARY OF THE INVENTION

It is an object of embodiments of the present invention to provide for a current supervisory device that exploits improved ways to detect and/or predict a fault or error event.

The above objective is accomplished by the solution according to the present invention.

In a first aspect the invention relates to a current supervisory device comprising:
  current sensing means for sensing a current,
  a circuit arranged to convert a signal received from the current sensing means into a signal indicative of the sensed current,
  storage means for storing a plurality of values of said signal indicative of the sensed current,
  a processing circuit arranged for receiving a subset of the plurality of values stored in the storage means, for detecting or predicting an event based on a function of said subset, and for generating a corresponding event signal,
wherein the current supervisory device further comprising an interface circuit arranged to output that corresponding event signal.

The proposed solution indeed allows for a quicker detection or prediction of an event, and so allows also for a quicker reaction, for example in case an error occurs, by choosing an appropriate function that operates on at least two values obtained at different moments in time. The at least two values belong to a time series of values indicative of the sensed current. Many options are available for choosing an appropriate function, as will become apparent later in this description.

In some embodiments the current supervisory device comprises a comparator to compare a value output by said function with a predetermined threshold level.

In advantageous embodiments the event is the occurrence of a fault. A fault can for example be an overcurrent or a malfunctioning electrical subsystem of a vehicle.

Preferably the function is taken from a group of functions comprising {a difference between values of the subset, a derivative of the signal indicative of the sensed current, a sum of values of the subset, an integral of the signal indicative of the sensed current taken over a given time frame, a frequency domain representation of the signal indicative of the sensed current, an envelope of the signal indicative of the sensed current, a correlation function between the plurality of values and a predefined data pattern}.

In some embodiments the function is a function of a voltage, a temperature or power derived from the subset.

In another embodiment the processing circuit comprises a neural network arranged to receive at its input the subset of the plurality of values.

In one embodiment the circuit arranged to convert said signal and the processing circuit are integrated.

In a preferred embodiment, the storage means is arranged for storing a plurality of functions. The processing circuit is arranged for selecting a function from the plurality. Advantageously, at least two functions of said plurality correspond to different events and the corresponding event signal is indicative of which event has occurred.

In some embodiments the storage means is distributed, comprising a first part for storing the plurality of values and a second part for storing the function.

In some embodiments the processing circuit is arranged to perform gain control in the circuit arranged to convert the signal. The selection of a function may then be based on a gain setting in said circuit.

In one aspect the invention also relates to the use of a current supervisory device as previously described in a vehicle, for measuring battery current or for measuring motor supply current or motor phase current.

The invention further relates to a system a current supervisory device as previously described and a conductor arranged to carry the current. In some embodiments the conductor may be a bus bar.

In some embodiments the system may further comprise circuit breaker arranged for receiving the corresponding event signal.

In another aspect the invention relates to a supervisory device comprising:
  magnetic sensing means for sensing a magnetic field,
  a circuit arranged to convert a signal received from the magnetic sensing means into a signal indicative of the sensed magnetic field,
  storage means for storing a plurality of values of said signal indicative of the sensed magnetic field,
  a processing circuit arranged for receiving a subset of the plurality of values stored in the storage means, for detecting or predicting an event based on a function of said subset, said function being stored in the storage means, and for generating a corresponding event signal, wherein the supervisory device further comprising an interface circuit arranged to output that corresponding event signal. The event may in preferred embodiments be a fault detected in a subset of the sequence of magnetic field values received from the magnetic sensing means.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
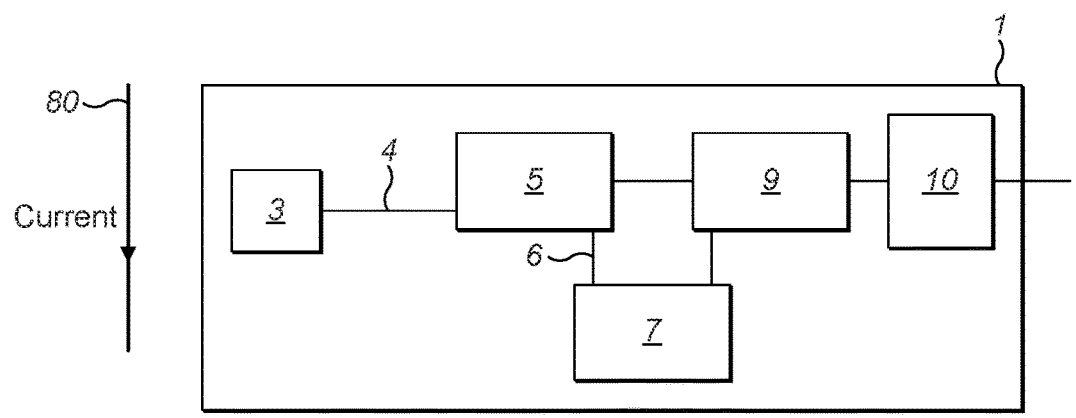
FIG. 1 illustrates a high level block scheme of a current supervisory device according to the present invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In contrast to prior art solutions, wherein for example the occurrence of an overcurrent is observed only when the current amplitude exceeds a predefined threshold level, the present invention reveals a current supervisory device arranged for detecting and/or predicting events, e.g. the occurrence or non-occurrence of a fault like an overcurrent, in more advanced ways which, in case it is needed, allow for example for faster intervention than in the prior art approach. In advantageous embodiments the current supervisory device is applied in a vehicle, e.g. an electric vehicle.

A basic block scheme of a current supervisory device (1) according to embodiments of the present invention is shown in FIG. 1. A sensor (3) is arranged to sense a current, e.g. a current in a conductor (80). The sensor output signal (4) is applied to a circuit (5) where the signal is converted into a signal (6) indicative of the sensed current, for example a digital signal comprising sampled current values. The values of the sensed current to be measured are output by the circuit (5) and stored in a memory (7). A time series of current values is so stored in the memory. In some embodiments the memory may be a circular buffer of a given fixed size, wherein the most recently obtained current value is added and the earliest obtained current value is removed in case the full buffer size is in use. The current supervisory device further comprises a processing circuit (9) that can receive a subset of one or, typically, more sensed current values stored in the memory. The processing circuit (9) is advantageously a digital signal processor. A function of at least two values obtained at different moments in time is then exploited to detect or predict from the behaviour of the current an event, for example the occurrence or non-occurrence of an overcurrent or a fault in the electrical source and/or load supplying or consuming, respectively, the current. A signal, herein referred to as event signal, is generated in the processing circuit in accordance with the detected or predicted event. The current supervisory device is further arranged to output the event signal corresponding to said event via an interface circuit. The interface circuit comprises at least a terminal (10) for outputting the event signal. In preferred embodiments the current supervisory device can also output an indication of the sensed current via the processing circuit and the interface circuit. A dedicated output terminal (not shown in FIG. 1) can be provided in the interface circuit for the indication of the sensed current. The current supervisory device can be implemented in various ways, as will become apparent from the example embodiments described below.

The sensor (3) is in advantageous embodiments a magnetic sensing element, e.g. a Hall sensor. The current can then be detected accurately and without contacting a wire through which the current flows. In such embodiments the current sensing means typically further comprises a voltage sensing means for detecting a voltage, e.g., over a Hall plate perpendicular to a biasing current through said Hall plate. Alternatively, the current sensing can be performed by means of a shunt resistor adapted to accurately produce an expected voltage for the supplied current. In some embodiments the sensing means may comprise a first sensor used for current measurements and a second sensor for event detection or prediction. For example, the first sensor may be a Hall sensor and the second sensor a shunt resistor, or vice versa. The shunt resistor may in some embodiments be external to the current supervisory device.

Figure 2:
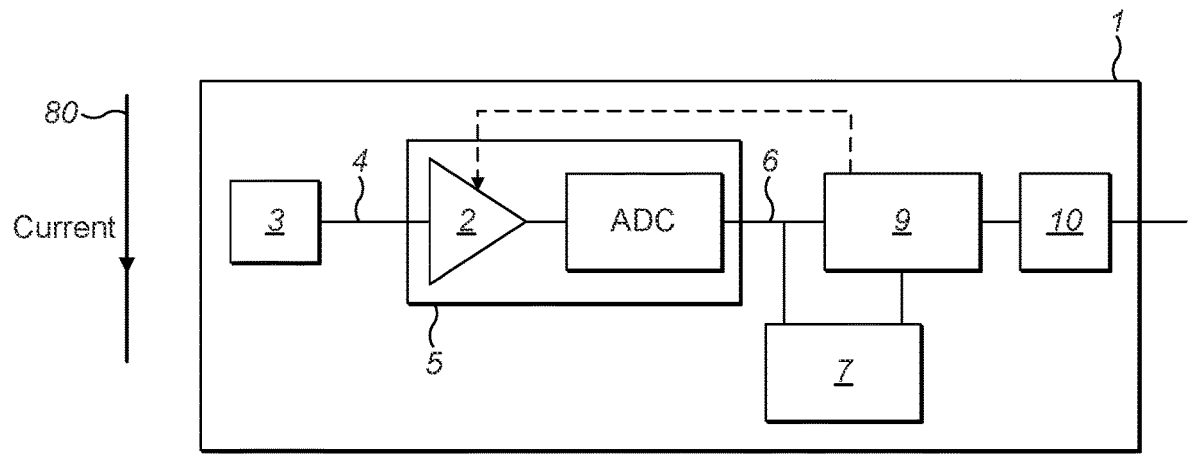
FIG. 2 illustrates an embodiment of the current supervisory device with an amplifier and an A/D converter.

In FIG. 2 a possible implementation is illustrated of a circuit (5) where the signal output by the sensor (3) is converted. As this signal is in general rather weak, in many embodiments an amplifier (2) is provided at the input of the circuit (5). The amplified signal is next digitized by means of an ADC. Note that in other embodiments the A/D conversion may be part of the processing circuit (9). The amplifier gain may be controlled (as is the case in the example of FIG. 2) by the processing circuit (9) such as to cover a large dynamic range of current measurements, e.g. from 1 A to 1000 A or even 2000 A. The interface circuit provided at the output side of the current supervisory device may for example be or comprise one or more pins for digital output and/or analog output. As already mentioned, optionally, also an indication of the sensed current may be output via a terminal of the interface circuit in some embodiments. This indication may then be applied to the terminal in an analog or in a digital form. In a current supervising device according to the invention, the processing circuit (9) determines a value of a function of two or more current values and the resulting function value is used for taking a decision on the status of the event. In case the event is related to fault detection or prediction (e.g. overcurrent prediction), the decision can for example be based on a comparison of the resulting function value with a predefined threshold level for that function. In the embodiment of FIG. 2 the comparison is performed in the processing circuit (9). For example, if the resulting function value is below the threshold value, an event signal may be generated having a value (e.g. corresponding to a logical low level) that indicates no overcurrent is detected or predicted, whereas in the case of a resulting function value exceeding the threshold value the event signal takes another value (e.g. corresponding to a logical high level), so indicating there is indeed an overcurrent situation and a fault is detected. Monitoring the event signal output by the current supervisory device so allows observing when an overcurrent error occurs. The event signal can be seen as a warning or alarm signal.

As mentioned above, the processing circuit receives the amplified signal and uses it to control the amplifier gain. In order to achieve a high precision on the of the sensor (3) output, the gain value may be changed a number of times before a sufficient, optimized, gain is determined. To obtain an optimized gain value, the amplified signal may be compared in the processing circuit with a reference signal, e.g., a predetermined threshold. In some embodiments said reference signal may be indicative of a saturation of a detecting means for detecting the amplified signal (e.g., of the ADC). In alternative embodiments the reference signal may be representative of a full scale, i.e., maximum output, of the amplifier (2). As one example, the gain is initially set at a first, high value. The amplified signal is then compared to a single reference signal. When the first amplified signal is above the reference signal, the processing circuit may set the gain to a second value lower than the first value. This algorithm (comprising said comparing and reducing of the gain) may be repeated until the amplified signal is lower than the reference signal. When the amplified signal is lower than the reference signal, the signal indicative of the current may be generated and/or outputted. In this way the detection means for detecting the amplified signal, and possibly of the signal indicative of the current based on the amplified signal, does not result in saturated detection means. It will be clear to the person skilled in the art that this is an example only, and different algorithms may be used instead. For example, alternatively, the gain may initially be set to a low value, the amplified signal may be compared to a reference signal, and the gain may be increased until the reference signal is reached. However, preferably, the gain is initially set to a maximum value, as it may be assumed the current to be monitored is lowest at start-up of, e.g., the electrical vehicle.

As an alternative, the processing circuit (9) may in some embodiments compare the amplified signal with a first, high, reference signal and with a second, low, reference signal. For example, the first reference signal may be a predetermined threshold signal that is from 70% to 90% of the full scale of the amplifier, and the second reference signal may be a predetermined threshold signal that is from 10% to 30% of the full scale. If the amplified signal is above the first reference signal, the gain may be reduced. If the amplified signal is below the second reference signal, the gain may be increased.

In combination with, or alternatively from, embodiments wherein the amplified signal is compared with the at least one reference signal, in embodiments, a derivative may be determined of the amplified signal, and compared to at least one predetermined threshold for the derivative. For example, if the determined derivative is above a first, positive, predetermined threshold for the derivative, implying that the detected current is increasing, it may be predicted that the gain may have to be increased. The gain may accordingly be increased, e.g., so as to keep the amplified signal in-between the first, low, reference signal and the second, high, reference signal discussed above. Accordingly, if the determined derivative is below a second, negative, predetermined threshold for the derivative, implying that the detected current is decreasing, it may be predicted that the gain may have to be decreased. The gain may accordingly be decreased, e.g., so as to keep the amplified signal in-between the first, low, reference signal and the second, high, reference signal discussed above. In a preferred embodiment, the amplified signal is compared to the first, low, reference signal, the second, high, reference signal, the first positive predetermined threshold for the derivative, and the second negative predetermined threshold for the derivative.

As such, a feedback loop may be implemented in some embodiments wherein the amplified signal is continuously traced, based on which the gain may be tuned so as to optimize the amplified signal. In embodiments, the gain is increased and/or decreased in gain steps (i.e., discontinuously), which may result in a fast gain optimization. In other words, in embodiments, a plurality of discrete gain values for the gain is used. That plurality of discrete gain values may be implemented by using, for example, different resistor or capacitor values in the feedback loop. The gain is adapted by selecting which resistor or capacitor value is connected in the feedback loop.

In some embodiments the interface circuit may also comprise an output terminal for the signal indicative of the sensed current. The signal indicative of the sensed current may be a digital signal coming from an analog-to-digital converter (ADC) comprised in the circuit 5 or a digital signal supplied to the interface circuit by the processing circuit (9). Alternatively, the analog signal, e.g. the signal output by the amplifier (2) can be applied to a terminal of the interface circuit. The interface circuit may then have an analog pin for an analog signal and a digital pin for a digital signal.

In some embodiments the function may be stored in the memory (7) where the current values are stored. In other embodiments the storage means comprise a separate memory for storing the function to be used. This is the case for example if a circular buffer is used to store the current values, which is obviously not suited for storing a function. In some embodiments a plurality of functions can be stored, from which one is selected for use. In yet other embodiments the one or more functions may be stored in an external memory and the function to be used is loaded into the signal processing circuit (9) when it is needed.

In some embodiments the event signal indicative of the event status is a continuous signal output via the event terminal. At the moment an error is actually detected, the status (value) of the event signal is changed (for example from a logical low to high level, or vice versa).

Although in this description often the example is used of the occurrence or non-occurrence of an overcurrent, hence overcurrent monitoring, as an event, the skilled person will readily understand that there are many examples of other events to be monitored or predicted that can be considered. Other possible events may for example relate to monitoring the occurrence of a short circuit or of a malfunctioning electrical subsystem in a vehicle, or malfunctioning car battery, or even a car crash.

Figure 3:
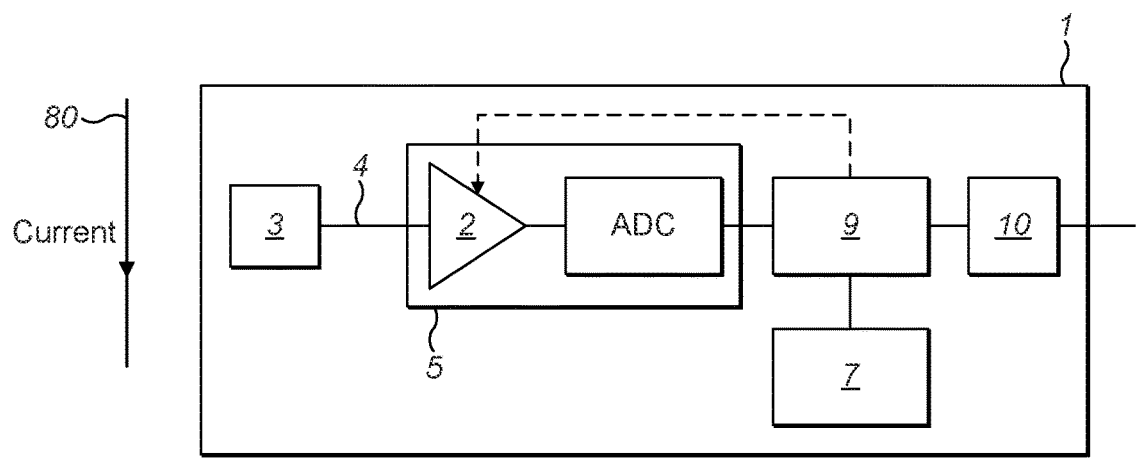
FIG. 3 illustrates an embodiment of the current supervisory device wherein current values are fed to the memory block via the signal processing circuit.

As already mentioned, in preferred embodiments of the invention the processing circuit may be a digital signal processor (DSP). In the exemplary embodiment depicted in FIG. 3 the digitized values representative of the sensed current are fed via the processing circuit (9) to the memory (7) for storage. The amplifier gain is controlled by the processing circuit (9) just as in FIG. 2. The algorithms as described above may be employed to do so. The processor circuit computes a value of a function of at least two current values and decides about the status of the event for example by comparing the resulting function value to a threshold value or by checking if the resulting function value lies within a predefined range. Examples of possible functions that may be used, are given later in this description. An event signal value corresponding to the determined event status is output by the current supervisory device. If indeed an erroneous operation is detected at a certain moment in time, a change in the event status (from 'no fault' to 'fault') occurs and consequently also a change in the output event signal value will reflect the detected fault. The event signal may be a one-bit signal.

In some embodiments the function is calculated using also the last obtained current value that is input to the processing circuit and one or more previously obtained values that were already stored in the memory.

Figure 4:
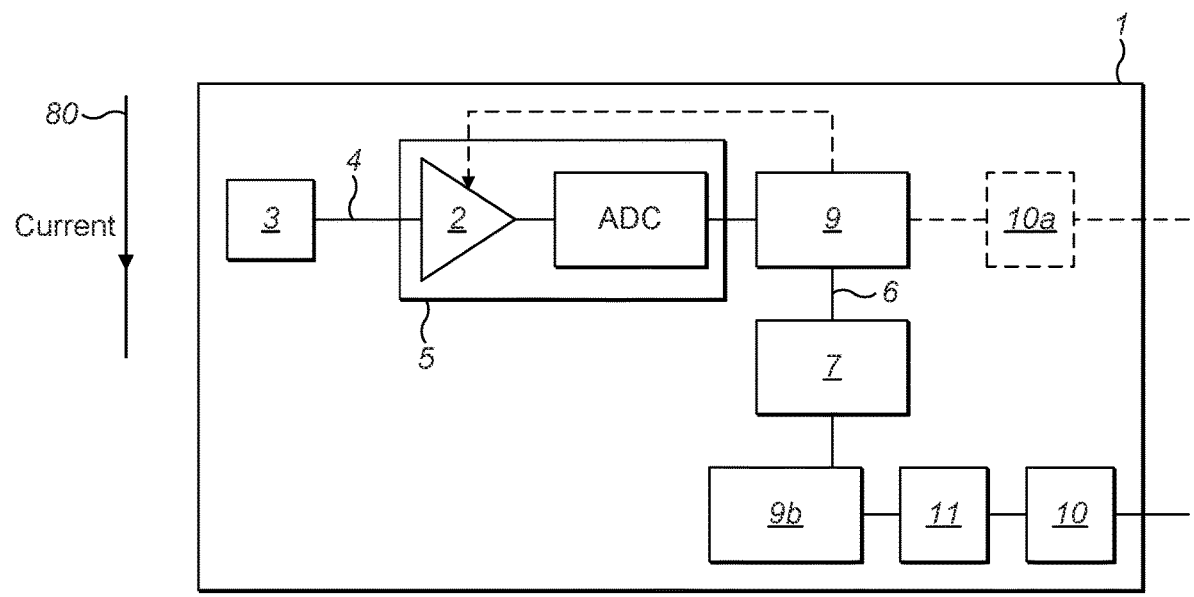
FIG. 4 illustrates an embodiment of the current supervisory device wherein the signal processing circuit is split into two parts.

A further embodiment of the current sensor device of the present invention is illustrated in FIG. 4. In this particular embodiment the processing circuit is split up in two separate subcircuits, a first subcircuit (9a) and a second subcircuit (9b). The second subcircuit may be a subcircuit different and/or independent from the first subcircuit. The second subcircuit (9b) is configured to calculate the function of two or more current values. In some cases the second subcircuit may also be arranged to receive the last obtained current value, but this is not shown in FIG. 4. The first subcircuit (9a) fulfils other tasks, like receiving the current values coming out of the ADC and forwarding them for storage in the memory. Further the subcircuit (9a) may be controlling the amplifier gain (as illustrated in the example of FIG. 4) as explained before. Optionally, the first subcircuit is connected to an output terminal (10a) of the interface circuit to output the indication of the sensed current. In the embodiment of FIG. 4 a comparator (11) is shown as a component separate from the processing (sub)circuit. The comparator performs a comparison of the resulting function value with a predefined threshold value or range and accordingly outputs an event signal, which is via an output terminal (10) of the interface circuit made available outside the current supervisory device. An advantage of having the second subcircuit (9b) and the comparator (11) separated from the first subcircuit is that the event can be detected independently of the main current measurement circuit (for example faster, or with redundancy, or using different signal processing techniques). In some embodiments the comparator (11) can be integrated into the second subcircuit (9b). In one embodiment all the processing blocks in the current supervisory device (1), i.e. all blocks shown in FIG. 4 except for the current sensing means, can be integrated in a single semiconductor package or a single integrated circuit. In another embodiment also the sensing means may be integrated.

Figure 5:
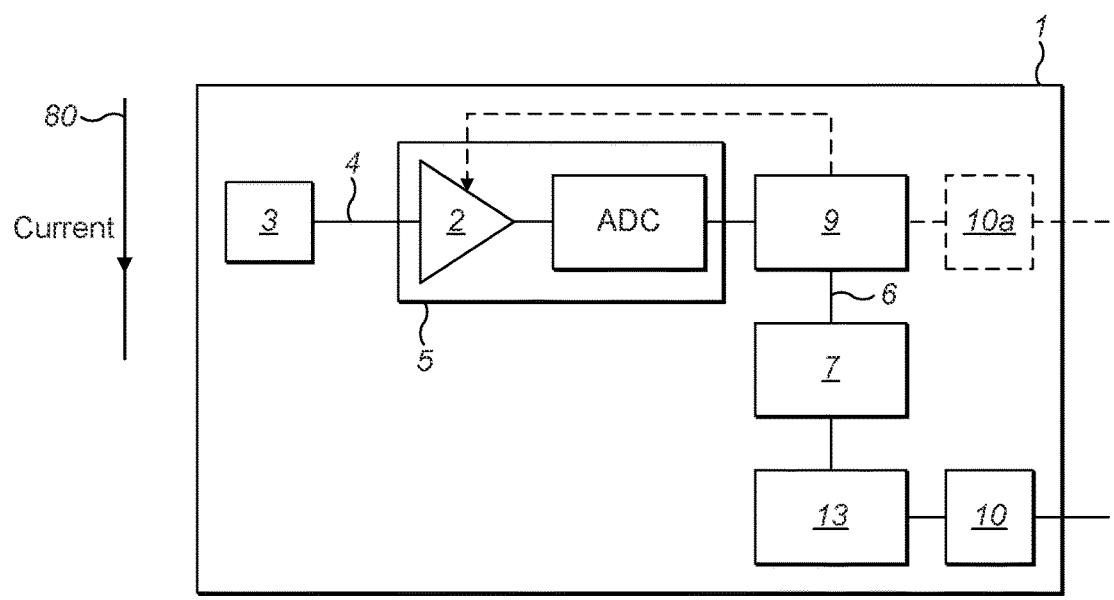
FIG. 5 illustrates an embodiment of the current supervisory device with a neural network.

FIG. 5 shows a particular embodiment of the scheme of FIG. 4, where the second subcircuit is implemented as a neural network (13). Alternatively, a model trained by machine learning may be used. The neural network receives the subset of current values, i.e. a time series of current values, as input values. The network is trained such as to output a signal indicative of the detection or prediction of an event. The neural network may be implemented as a digital processing circuit or may be made by means of a neural network accelerator, either digitally or in an analog way. More details are provided later in this description.

In some embodiments the current sensing means (3) and the circuit (5) to convert the signal received from the current sensing means can be integrated, for example in a single integrated circuit.

Figure 6:
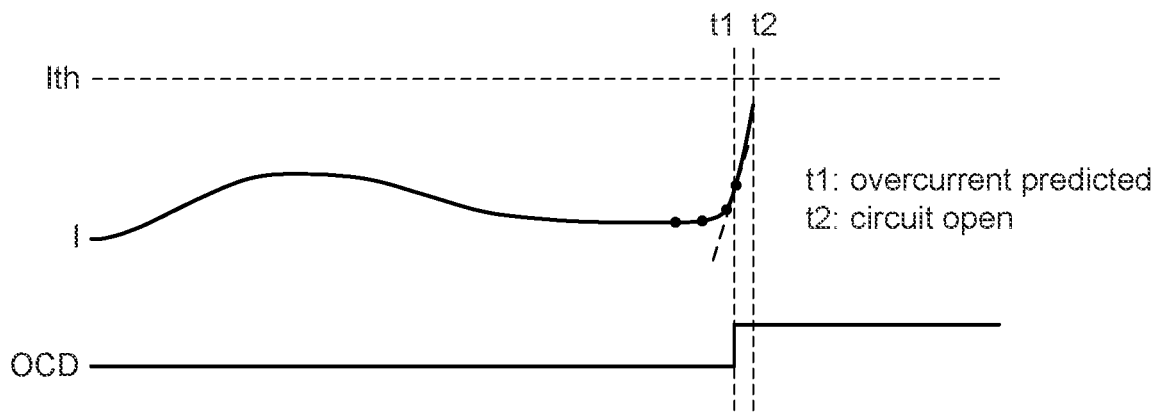
FIG. 6 illustrates the use of a derivative as function.

Some possible functions that can be used for detecting or predicting a fault are now presented. In FIG. 6 various current values have been represented in a graph I as a function of time t. A derivative dI/dt can then be determined. If at time instant t1 is found that the value of dI/dt exceeds a given threshold value (in other words, if the rise in the curve is too steep at time instant t1), the error event is already detected. If a discrete set of current values is available, as is the case in the approach of this invention, the detection or prediction of an error event can be done by determining finite differences between measurement points. For example, assuming an overcurrent situation is detected at t1, the circuit can already be opened at time instant t2. This may be much earlier than in the prior art solutions: for comparison, a dotted line is drawn in FIG. 6 that represents a threshold level Ith to which an observed current amplitude value is compared as may be done in a prior art approach. As illustrated in the figure it would take much longer before any action is taken if the overcurrent detection were based on comparison with a fixed threshold level.

Figure 7:
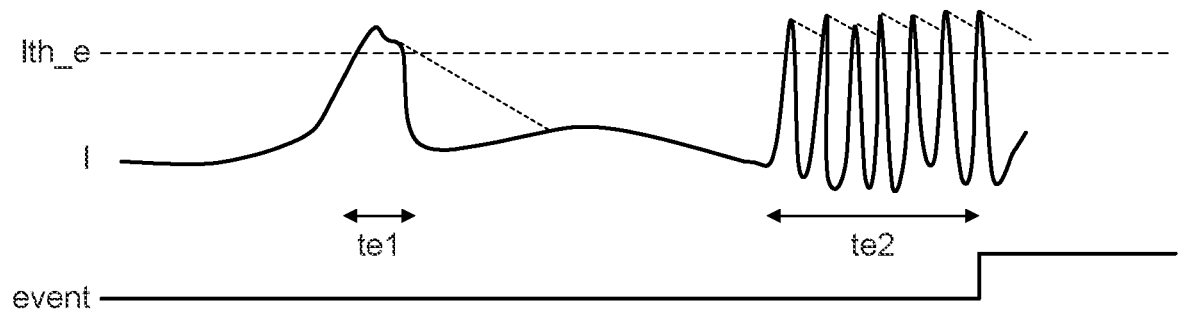
FIG. 7 illustrates the use of an envelope as function.

In FIG. 7 an envelope function of the current values is monitored in order to detect or predict an error. An error is assumed to be detected, when that envelope of the current signal is higher than a predefined level Ith_e for a predefined duration, as illustrated in the example of FIG. 7. The threshold Ith_e is exceeded for a time te1 shorter than the predefined duration but the event signal is not affected and keeps its value. However, when the threshold is again exceeded for a period te2 longer than the predefined duration, the event signal value is changed to indicate the detected incident. Note that in this example it may be that the signal remains at all times under a threshold value that would be applied to compare a single current amplitude value with as in the prior art solutions, if said threshold value would be above the indicated Ith_e for the predefined duration.

In another embodiment the function may be the standard deviation of the current sample values stored in the memory. A sudden rise of the standard deviation may indicate erroneous operation.

Figure 8:
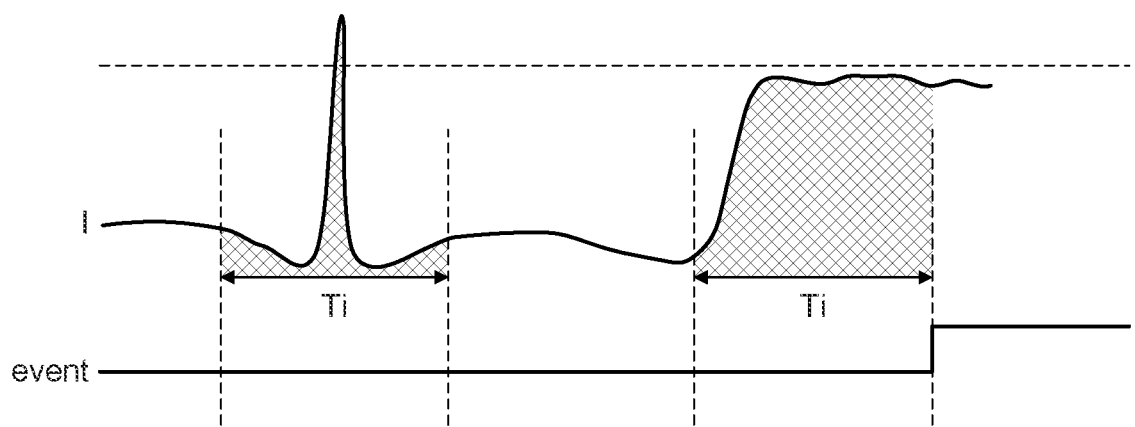
FIG. 8 illustrates the use of an integral as function.

FIG. 8 illustrates yet another option. In FIG. 8 an integral (discrete sum) of the current signal is computed over a given time interval. The resulting function value is then compared to a given threshold level. For example, in the interval Ti at the left side of the figure, the resulting value of the integral is still below a given threshold level and the event signal (at the bottom of the figure) remains the same. However, in the time interval Ti a bit later in time (see right hand side of the figure) the function value resulting from the integration exceeds the threshold level and a change in the event signal value occurs. As illustrated in the figure it is to be noted that during this second Ti interval the current signal never exceeds the threshold level applied the current amplitude with in the prior art approach (indicated in dashed line in FIG. 8).

Figure 9:
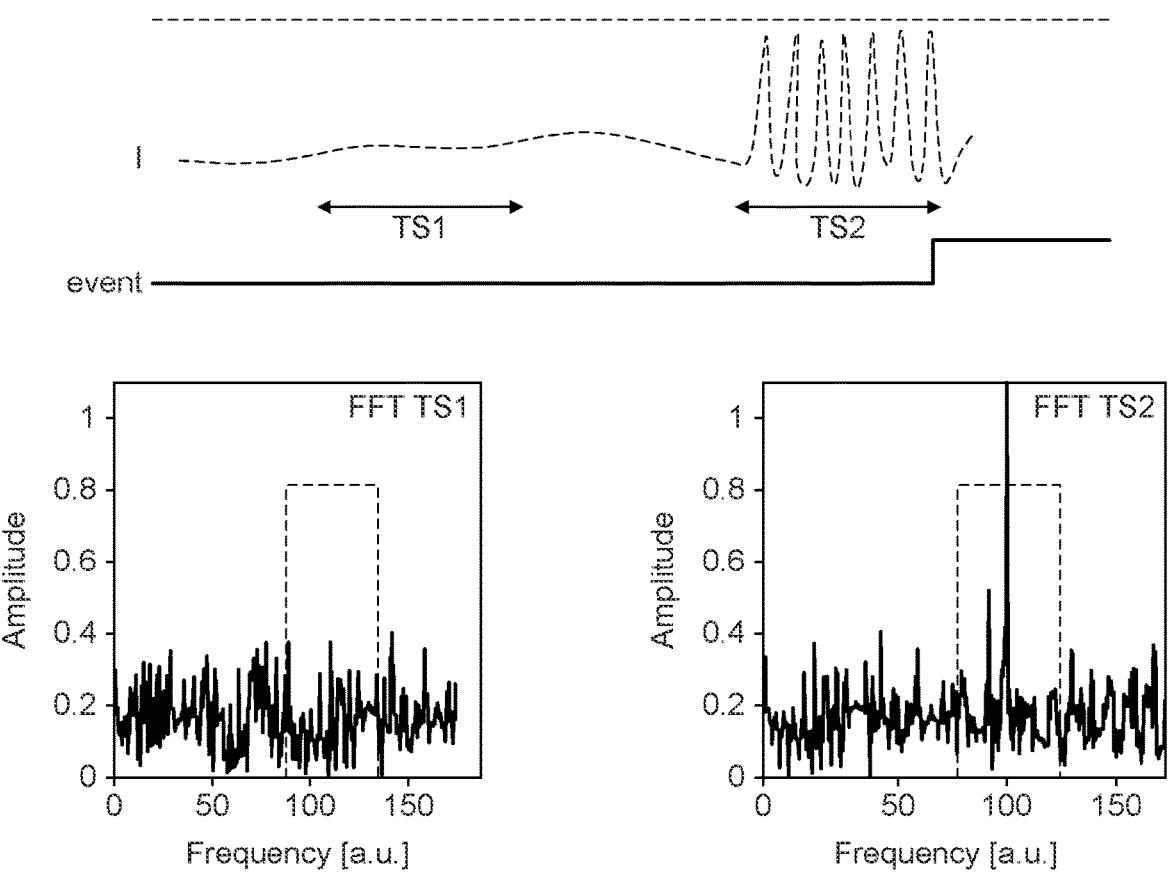
FIG. 9 illustrates the use of an FFT transformed signal in the function calculation.

Another possible function that can be used, may be based on a frequency domain representation of the signal indicative of the sensed current, for example a Fast Fourier Transform (FFT) of the time series of current sample values stored in the memory. The processing circuit then processes the FFT representation of the signal to detect or predict an event, for example by applying a function defined in the frequency domain. An event can for example be detected from the frequency and/or magnitude of peaks in the power spectral density by comparing them to one or more predetermined thresholds. In an example illustrated in FIG. 9 the sensed values of the current are shown. Note that at any time the current is below the dashed line indicating the threshold level that would be applied in the prior art solutions. An FFT is calculated using the current samples during interval TS1. The resulting frequency domain signal is then, in this particular example, compared in amplitude to a given amplitude threshold level for the spectral components. As the threshold level is not exceeded, the event signal remains in its logical low state. However, somewhat later in time the FFT is taken over interval TS2 and a frequency domain signal is obtained having a peak above the threshold level, which leads to a change in the event signal from the low to the logical high state. Alternatively, a model trained by machine learning or a neural network can receive the frequency domain representation and be arranged for detecting an event in the FFT representation. The model or the neural network may be trained using the sensed current when controlled events are willingly generated in a system (e.g. defects or faults), as explained below. The model may be stored in the processing circuit or in an external memory and loaded into the processing circuit when needed.

In another embodiment the function is a cross-correlation function that determines a correlation between the subset of current values and a predetermined data pattern or a predetermined shape. The predetermined data pattern may for example be an exponential data pattern, or a pattern of a step function, a monotonically increasing or decreasing function or a train of pulses, without being limited thereto. The data pattern or shape may be stored in the memory (7) or another memory, possibly external to the current supervisory device, and loaded into the processing circuit for carrying out the cross-correlation calculation.

Figure 10:
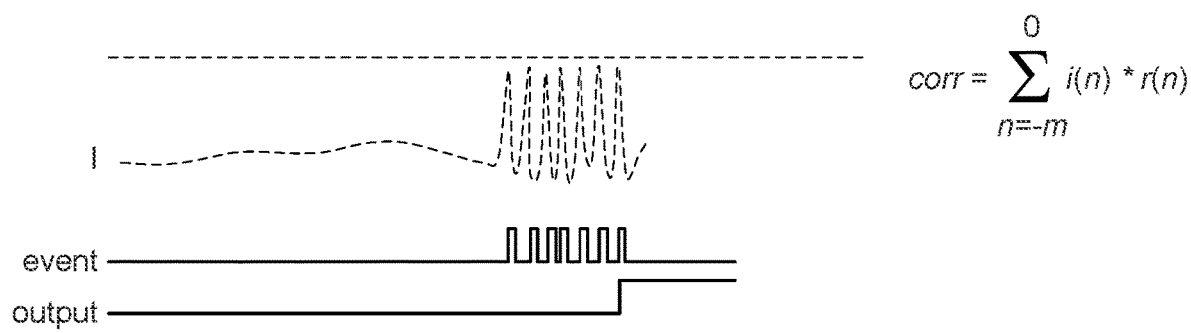
FIG. 10 illustrates the use of a correlation function.

An example is provided in FIG. 10. The behaviour of the current I is illustrated. A cross-correlation is determined between a set of current sample values and a predetermined data pattern, which is in this example the data pattern with exponential increase shown in the left hand part of FIG. 11. When the calculated cross-correlation exceeds a given threshold value, this is reflected in a change in the event signal value. In this example an output signal is outputted when a predetermined number of events is detected (in this example 7 events). Of course, the predetermined data pattern may also include several times the same pattern, for example multiple exponential increases, or multiple peaks. Alternatively, the output signal may be outputted when a single event is detected.

In some embodiments a plurality of functions can be stored and the processing circuit is arranged to select a function from the plurality of available functions. The selection may for example be based on the state of a vehicle comprising the current supervisory device. The state may be e.g. the vehicle being parked or the vehicle driving or may be determined as a function of the vehicle speed.

In embodiments with multiple functions being stored to make a selection it is also possible to link a different function to a different event. In some embodiments the various functions can be used in an order set by the user. The user can so decide on how often a check is performed for the various events to be monitored using the corresponding function. Each function may be linked to an own threshold level value. A different event signal is then preferably used for each of the events, so that from the emitted event signal it is immediately clear which type of vent has occurred. For example, one function may be used to monitor whether an overcurrent occurs and another function may serve to monitor the operation of a vehicle battery.

Figure 11:
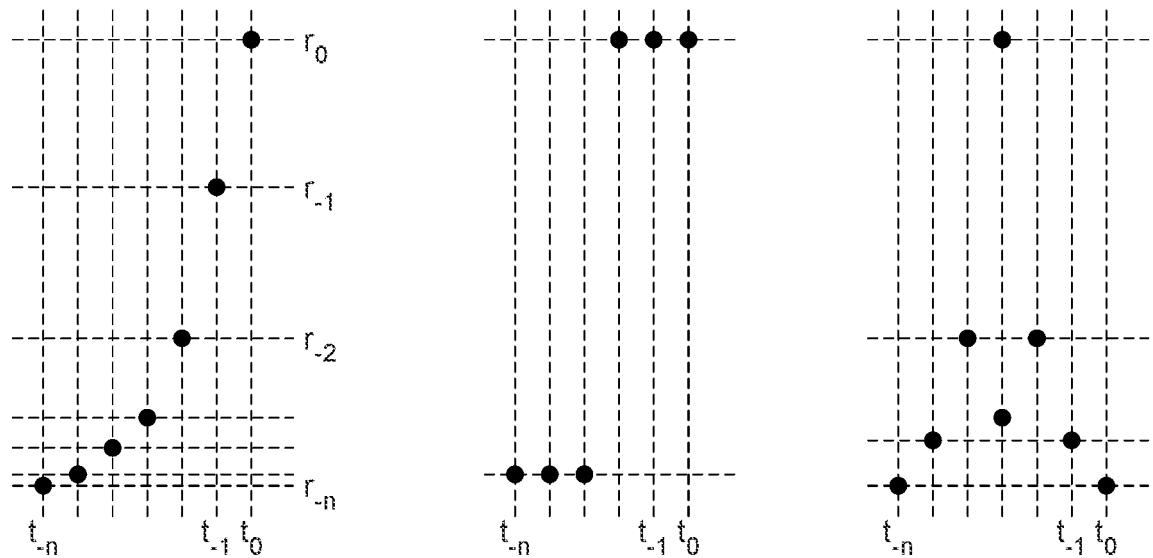
FIG. 11 illustrates some possible data patterns that can be applied in a correlation calculation.

In case the function is a cross-correlation function, for example, distinct predetermined data patterns may be provided for distinct events. FIG. 11 illustrates some possible data pattern shapes: (from left to right) exponential, stepwise, pulse like. In other embodiments a combination of one or more cross-correlation functions with corresponding data pattern and another type of function is used (e.g. cross-correlation function of an exponential predetermined pattern and a derivative function).

In embodiments where a cross-correlation function is applied and two or more predetermined data patterns are available to make a selection from, this selection may be based on the state of the vehicle comprising the current supervisory system. Each state (each pattern) can have a dedicated threshold value to compare the obtained function value with. The state may for example indicate whether the vehicle is parked or driving. The state of the vehicle may also depend on the actual driving speed. The same holds in case one or more cross-correlation functions and one or more other function types are employed.

From the examples of functions that can be applied as set out above, it is clear that the applied function can often be equated to a linear combination of current samples stored in the memory. The linear combination can be written as $$f=a_0*i_0+a_1*i_1+ \ldots +a_n*i_n$$

where the values $a_i$ represent a coefficient and the $i_i$ a current sample value. In the case of an integral, coefficients $a_0=a_1=a_n$ may equal 1 or another constant. In case of a derivative, values $a_0=1$ and $a_1=-1$ can be taken, for example. In case of a cross-correlation function, the coefficients are the predetermined data pattern values.

In case of a model derived by machine learning, the coefficients are trained such as to predict an event. The coefficient training can be performed in a controlled environment by replicating a faulty current sequence when introducing controlled faults. For example, during a development or calibration phase (before the system is put in operation at the customer), the current measured by the current supervisory device is measured and recorded when introducing a controlled event in the system, such as a fault (e.g. a short-circuit or overcurrent). The operation can be conducted a number of times, thus obtaining multiple characteristic current sequences corresponding to a known event, for example. The coefficients of a model trained by machine learning, or the weight of a neural network can then be trained using the recorded current sequence or the plurality of current sequences. In some embodiments, reference current sequence may be representative of a fault in the system. Various machine learning models and neural networks can be used. As already said, parameters such as coefficients, weights, but also biases, offsets and thresholds can be trained using techniques known in the art. For example, a model or neural network can be trained outside the current supervisory device. The parameters obtained from the training are stored in storage means. They can be stored in the supervisory device, for example. In embodiments, the parameters can be stored outside the supervisory device, for example in an ECU. In another example, faulty sub-systems (e.g. battery, electric motor, actuators, sensors, electronic systems, etc.), for example sub-systems comprising controlled defects, can be introduced in the system. As for the short-circuit or overcurrent event, the current measured by the current supervisory device can be measured, recorded and finally used to train a machine learning model or a neural network. Defective sub-systems can be introduced one by one, and therefore at least one reference sequence is obtained for each characteristic defect. In embodiments of the present invention, the selection of the function or the training of a machine learning model or neural network can be based on current samples recorded in identified defective systems that have already been deployed in operation. For example, a reference faulty current sequence is measured and recorded in a system (e.g. a car) where a defect or failure occurred after having been put in operation, or used by the end user, and subsequently used as a reference input current sequence for training a model using machine learning techniques, or a neural network. The current sequence may be measured, or downloaded from a system wherein the current supervisory device is implemented, when being serviced, for example.

Figure 12:
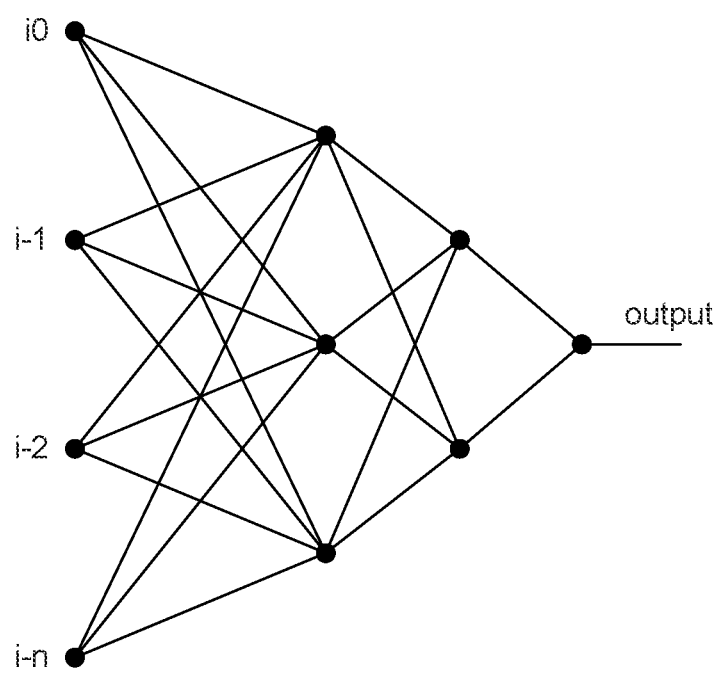
FIG. 12 illustrates a neural network.

FIG. 12 shows a neural network according to some embodiments of the present invention. The neural network comprises an input layer arranged for receiving the current subset, i.e. the time series of current samples. The neural network typically comprises at least one hidden layer. In the example of FIG. 12, two hidden layers are shown. In embodiments of the present invention, the neural network comprises a plurality of hidden layers The neural network also comprises an output layer. In this example the output layer comprises one output node for outputting a signal representative of the prediction of an event such as a fault (e.g. overcurrent, or short-circuit). In embodiments, the neural network comprises multiple output nodes in the output layer. Typically, the neural network is trained such that each output nodes outputs a signal representative of different events. As mentioned above, the training may be performed by replicating an event in a controlled development or calibration environment, or by using one or more current sequences from a faulty system after commissioning (e.g. during maintenance or repair after a failure occurred). Typically, the training of the model or neural network may be performed in an external system, i.e. outside the supervisory device, and the parameters resulting from the training are stored in the storage means. In embodiments, multiple set of training coefficients are stored for different events. Each set can be selected, for example depending on a state of the car or a range of the current being measured.

The function selection or correlation data pattern selection may in embodiments be based on the range of current measurement (gain control) and/or the magnitude of the current. Some events may be detectable when a low current is being measured, e.g. when the car is not driving. When the overall current is low, failure of subsystems having low current consumption may be detected, while this could not be detectable when the overall current is high (e.g. when driving).

The current to be sensed by the current sensor of the current supervisory device may in some embodiments be a current provided by a source (e.g. car battery) to a load or to a plurality of loads. The multiple loads may for instance be an electric motor for a powertrain, actuators (e.g. power steering, steer-by-wire), sensors, entertainment electronics, lightning, etc Advantageously, in some applications, apart from the current, a second physical quantity is monitored, like e.g. a temperature (e.g. the temperature of the current supervisory device itself) or a voltage, for example a battery. In such embodiments the current supervisory device comprises voltage detection means and/or temperature detection means. The processing circuit then also receives a signal indicative of the one or more other sensed quantities. In accordance with the detected quantity a corresponding event signal is generated, which subsequently also serves as a further basis for modulating the output signal, together with the event signal that was generated from the signal indicative of the sensed current. In further embodiments more than one other physical quantity can be monitored apart from the current, e.g. both voltage and temperature. The current supervisory device may output a signal that differentiates between the different events.

In an aspect the invention relates to a system comprising a current supervisory device as described above and a conductor wherein the current to be sensed flows. The conductor, typically positioned close to the current supervisory device, may for example be a busbar for distributing power e.g. in a vehicle. Note that in that case all processing is still performed close to the busbar, more in particular in the processing circuit of the current supervisory device as explained above.

When implemented in a vehicle, the system advantageously also comprises an electronic control unit (ECU). In some embodiments this ECU may comprise a processing subcircuit that performs (at least a) part of the processing required in the derivation of the event signal. Such processing subcircuit may then for example be one of the subcircuits (9a,9b) shown in FIG. 4.

The system may in some embodiments further comprise a circuit breaker, e.g. a fuse, connected to the current supervisory device. When for example a short circuit is detected, the fuse may then be trigger by the event signal output by the current supervisory device.

In embodiments wherein the outputted event signal can indicate various events, one event signal value may trigger the fuse, whereas another event may trigger a different action such as indicating a fault to the driver of the vehicle (e.g. failure in non-safety critical subsystem).

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for current supervision comprising:
   current sensing means for sensing a current,
   a circuit arranged to convert a signal received from said current sensing means into a signal indicative of the sensed current,
   storage means for storing a plurality of values of said signal indicative of the sensed current,
   a processing circuit arranged for performing gain control in said circuit by selecting a gain setting applied to the signal received from the current sensing means, for receiving a subset of said plurality of values stored in said storage means, for detecting or predicting an event by computing a value of a function of said subset, said function being selected based on said gain setting applied in said circuit, and for generating a corresponding event signal,
   said current supervisory device further comprising an interface circuit arranged to output said corresponding event signal.

2. The device as in claim 1, comprising a comparator to compare a value output by said function with a predetermined threshold level.

3. The device as in claim 1, wherein said event is the occurrence of a fault.

4. The device as in claim 1, wherein said function is taken from a group of functions comprising {a difference between values of said subset, a derivative of said signal indicative of the sensed current, a sum of values of said subset, an integral of said signal indicative of the sensed current taken over a given time frame, a frequency domain representation of said signal indicative of the sensed current, an envelope of said signal indicative of the sensed current, a correlation function between said plurality of values and a predefined data pattern, a standard deviation of values of said subset}.

5. The device as in claim 1, wherein said function is a function of a voltage, a temperature or power derived from said subset.

6. The device as in claim 1, wherein said processing circuit comprises a neural network and/or model trained by machine learning arranged to receive at its input said subset of said plurality of values.

7. The device as in claim 1, wherein said circuit arranged to convert said signal and said processing circuit are integrated.

8. The device as in claim 1, wherein said storage means is arranged for storing a plurality of functions and wherein said processing circuit is arranged for selecting a function from said plurality.

9. The device as in claim 8, wherein at least two functions of said plurality correspond to different events and wherein said corresponding event signal is indicative of which event has occurred.

10. The device as in claim 1, wherein said storage means is distributed, comprising a first part for storing said plurality of values and a second part for storing said function.

11. The device as in claim 1, for use in a vehicle, for measuring battery current or for measuring motor supply current or motor phase current.

12. A system comprising the device for current supervision as in claim 1 and a conductor arranged to carry said current.

13. The system as in claim 12, wherein said conductor is a busbar.

14. The system as in claim 12, further comprising a circuit breaker arranged for receiving said corresponding event signal.

* * * * *